US010400678B2

(12) United States Patent
Hallman et al.

(10) Patent No.: US 10,400,678 B2
(45) Date of Patent: Sep. 3, 2019

(54) APPARATUS AND SYSTEM FOR LIGHT-WEIGHT, FLEXIBLE DOUBLE-HELICAL GEAR

(71) Applicant: General Electric Company, Schenectady, NY (US)

(72) Inventors: Darren Lee Hallman, Scotia, NY (US); Kenneth Lee Fisher, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 328 days.

(21) Appl. No.: 15/397,019

(22) Filed: Jan. 3, 2017

(65) Prior Publication Data

US 2018/0187753 A1   Jul. 5, 2018

(51) Int. Cl.
| | | |
|---|---|---|
| *F16H 57/08* | (2006.01) | |
| *F02C 7/36* | (2006.01) | |
| *F02K 3/06* | (2006.01) | |
| *F16H 57/04* | (2010.01) | |

(52) U.S. Cl.
CPC .................. *F02C 7/36* (2013.01); *F02K 3/06* (2013.01); *F16H 57/08* (2013.01); *F05D 2260/40311* (2013.01); *F16H 57/0431* (2013.01); *F16H 57/0479* (2013.01); *Y02T 50/671* (2013.01)

(58) Field of Classification Search
None
See application file for complete search history.

(56) References Cited

U.S. PATENT DOCUMENTS

| | | | |
|---|---|---|---|
| 5,784,923 | A | 7/1998 | Kuehnle |
| 6,912,786 | B2 | 7/2005 | Jinkins et al. |
| 8,123,413 | B2 | 2/2012 | Tambe et al. |
| 8,172,717 | B2 | 5/2012 | Lopez et al. |
| 8,198,744 | B2 | 6/2012 | Kern et al. |
| 8,235,861 | B2 | 8/2012 | Lopez et al. |
| 8,287,423 | B2 | 10/2012 | Lopez et al. |

(Continued)

FOREIGN PATENT DOCUMENTS

| | | |
|---|---|---|
| CN | 202796610 U | 3/2013 |
| CN | 104989808 A | 10/2015 |

(Continued)

OTHER PUBLICATIONS

Dudley, "Gear Handbook: The design, Manufacture, and Application of Gears", McGraw-Hill Bbook Company, 1962, pp. 3-14 and 3-15.*

(Continued)

*Primary Examiner* — Derek D Knight
(74) *Attorney, Agent, or Firm* — Armstrong Teasdale LLP (57) ABSTRACT

A gear includes a first gear rim, a second gear rim, and an axial groove. The first gear rim has a first gear rim rotational stiffness and includes a plurality of first gear teeth. The second gear rim has a second gear rim rotational stiffness. The second gear rim includes a plurality of second gear teeth complementing the plurality of first gear teeth defining a plurality of complementary first gear teeth and a plurality of complementary second gear teeth. The axial groove extends between the first gear rim and the second gear rim. The axial groove has an axial groove rotational stiffness that less than at least one of the first gear rim rotational stiffness and the second gear rim rotational stiffness.

20 Claims, 7 Drawing Sheets

(56) References Cited

U.S. PATENT DOCUMENTS

| | | |
|---|---|---|
| 8,298,114 B2 | 10/2012 | Lopez et al. |
| 8,459,872 B2 | 6/2013 | Nies et al. |
| 8,491,435 B2 | 7/2013 | Ghanime et al. |
| 8,506,446 B2 | 8/2013 | Minadeo et al. |
| 8,517,672 B2 | 8/2013 | McCooey |
| 8,550,955 B2 | 10/2013 | Erno et al. |
| 8,550,957 B2 | 10/2013 | Erno et al. |
| 8,657,714 B1 | 2/2014 | Ghanime et al. |
| 8,696,314 B2 | 4/2014 | Mashue et al. |
| 8,727,632 B2 | 5/2014 | Do et al. |
| 8,777,792 B2 | 7/2014 | Imai et al. |
| 8,777,802 B2 | 7/2014 | Erno et al. |
| 8,857,192 B2 | 10/2014 | Huang et al. |
| 8,904,746 B2 | 12/2014 | Fang |
| 2010/0240490 A1 | 9/2010 | Schafer |
| 2013/0095974 A1 | 4/2013 | Imai et al. |
| 2015/0240931 A1 | 8/2015 | Venter |
| 2016/0201793 A1 | 7/2016 | Muldoon |
| 2017/0108113 A1* | 4/2017 | Hasting ............... F16H 57/0471 |

FOREIGN PATENT DOCUMENTS

| | | |
|---|---|---|
| EP | 2 264 336 B1 | 9/2012 |
| EP | 2803436 A2 | 11/2014 |

OTHER PUBLICATIONS

Fox et al., "Use of the Integrated Flexpin Bearing for Improving the Performance of Epicyclical Gear Systems", Power Transmission and Gearing, ASME 2003 International Design Engineering Technical Conferences and Computers and Information in Engineering Conference, vol. 4, Paper No. DETC2003/PTG-48121, pp. 1003-1011, pp. 9, 2003.

Imai et al., "Design and Test of Differential Planetary Gear System for Open Rotor Power Gearbox", ASME 2013 Power Transmission and Gearing Conference, ASME 2013 International Design Engineering Technical Conferences and Computers and Information in Engineering Conference, vol. 5, Paper No: DETC2013-12089, pp. V005T11A043, pp. 10, 2013.

International Search Report and Written Opinion issued in connection with corresponding PCT Application No. PCT/US2017/062924 dated Apr. 9, 2018.

* cited by examiner

APPARATUS AND SYSTEM FOR LIGHT-WEIGHT, FLEXIBLE DOUBLE-HELICAL GEAR

BACKGROUND

The field of the disclosure relates generally to an apparatus and system for gears in aviation engines and, more particularly, to an apparatus and system for a light-weight flexible gear in a gearbox in aviation engines.

Aircraft engines typically include a plurality of gearboxes including a plurality of gears. Some gearboxes include power gearboxes and accessory gearboxes. At least some of the gears are double helix type gears with an axial groove separating a first gear rim and a second gear rim. First and second gear rims each include a plurality of gear teeth positioned on a radially outer surface of the first and second gear rims. Each gear tooth includes an apex at the forward most portion of the tooth in the direction of rotation. Each gear tooth on the first gear rim complements a gear tooth on the second gear rim. The axial groove separating the two gear rims does not include gear teeth. During operations, loads on the gears may misalign the gear rims and the gear teeth on the gear rims. When the gear teeth are misaligned, the apexes of each tooth are misaligned as well. Misalignment of the gear teeth reduces the efficiency and power output of the gearboxes and decreases the service life of the gear teeth.

BRIEF DESCRIPTION

In one aspect, a gear is provided. The gear includes a first gear rim, a second gear rim, and an axial groove. The first gear rim has a first gear rim rotational rotational stiffness and includes a plurality of first gear teeth. The second gear rim has a second gear rim rotational stiffness. The second gear rim includes a plurality of second gear teeth complementing the plurality of first gear teeth defining a plurality of complementary first gear teeth and a plurality of complementary second gear teeth. The axial groove extends between the first gear rim and the second gear rim. The axial groove has an axial groove rotational stiffness that less than at least one of the first gear rim rotational stiffness and the second gear rim rotational stiffness.

In another aspect, a gear assembly is provided. The gear assembly includes a sun gear, a ring gear, and a plurality of planet gears. The plurality of planet gears is coupled to the ring gear and the sun gear. Each planet gear of the plurality of planet gears includes an annular planet gear rim including a first gear rim, a second gear rim, and an axial groove. The first gear rim has a first gear rim rotational stiffness and includes a plurality of first gear teeth. The second gear rim has a second gear rim rotational stiffness. The second gear rim includes a plurality of second gear teeth complementing the plurality of first gear teeth defining a plurality of complementary first gear teeth and a plurality of complementary second gear teeth. The axial groove extends between the first gear rim and the second gear rim. The axial groove has an axial groove rotational stiffness that less than at least one of the first gear rim rotational stiffness and the second gear rim rotational stiffness.

In yet another aspect, a turbomachine is provided. The turbomachine includes a power shaft and a gear assembly. The power shaft is rotationally coupled to the gear assembly. The gear assembly includes a sun gear, a ring gear, and a plurality of planet gears. The plurality of planet gears is coupled to the ring gear and the sun gear. Each planet gear of the plurality of planet gears includes an annular planet gear rim including a first gear rim, a second gear rim, and an axial groove. The first gear rim has a first gear rim rotational stiffness and includes a plurality of first gear teeth. The second gear rim has a second gear rim rotational stiffness. The second gear rim includes a plurality of second gear teeth complementing the plurality of first gear teeth defining a plurality of complementary first gear teeth and a plurality of complementary second gear teeth. The axial groove extends between the first gear rim and the second gear rim. The axial groove has an axial groove rotational stiffness that less than at least one of the first gear rim rotational stiffness and the second gear rim rotational stiffness.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Embodiments of the light-weight, flexible double-helical gear described herein align complementary gear teeth of a double-helical gear. The double-helical includes a first gear rim, a second gear rim, and an axial groove extending between the first gear rim and the second gear rim. Gear teeth are disposed circumferentially about an outer radial surface of the first and second gear rims. The gear teeth on the first gear rim complement the gear teeth on the second gear rim. The first and second gear rims each have a first and second gear rim rotational stiffness and the axial groove has an axial groove rotational stiffness which is less than the first and second gear rim rotational stiffness. During operations, operational loads on the gear may misalign the complementary teeth on the first and second gear rims. The reduced rotational stiffness of the axial groove allows the first and second gear rims to realign with each other as operational loads are placed on the gear. The realignment of the first and second gear rims facilitates realignment of the complementary teeth on the first and second gear rims. In an embodiment of the double-helical gear, the axial groove includes penetrations which reduce the rotational stiffness of the axial groove and facilitates realignment of the first and second gear rims. In another embodiment, the axial groove includes voids or pockets within the axial groove material which reduce the rotational stiffness of the axial groove and facilitates realignment of the first and second gear rims. In yet another embodiment, the axial groove has a lesser thickness than the first and second gear rims. The shorter thickness of the axial groove reduces the rotational stiffness of the axial groove and facilitates realignment of the first and second gear rims. In all of these embodiments, the axial groove acts as a spring between the first and second gear rims that may be tuned through geometry or material selection to provide the stiffness necessary to allow circumferential realignment of the two sets of gear teeth.

The double-helical gear described herein offers advantages over known double-helical gear in aircraft engines. More specifically, the double-helical gear described herein realigns the first and second gear rims when operational loads misalign the first and second gear rims. Maintaining the alignment of the first and second gear rims increases the efficiency and improves the durability of the gear assembly and the gas turbine engine. Additionally, the penetrations within the axial groove facilitate movement of oil around the double-helical gear. Furthermore, the double-helical gear described herein reduces the weight of the aircraft by reducing the amount of material in the axial groove.

Figure 1:
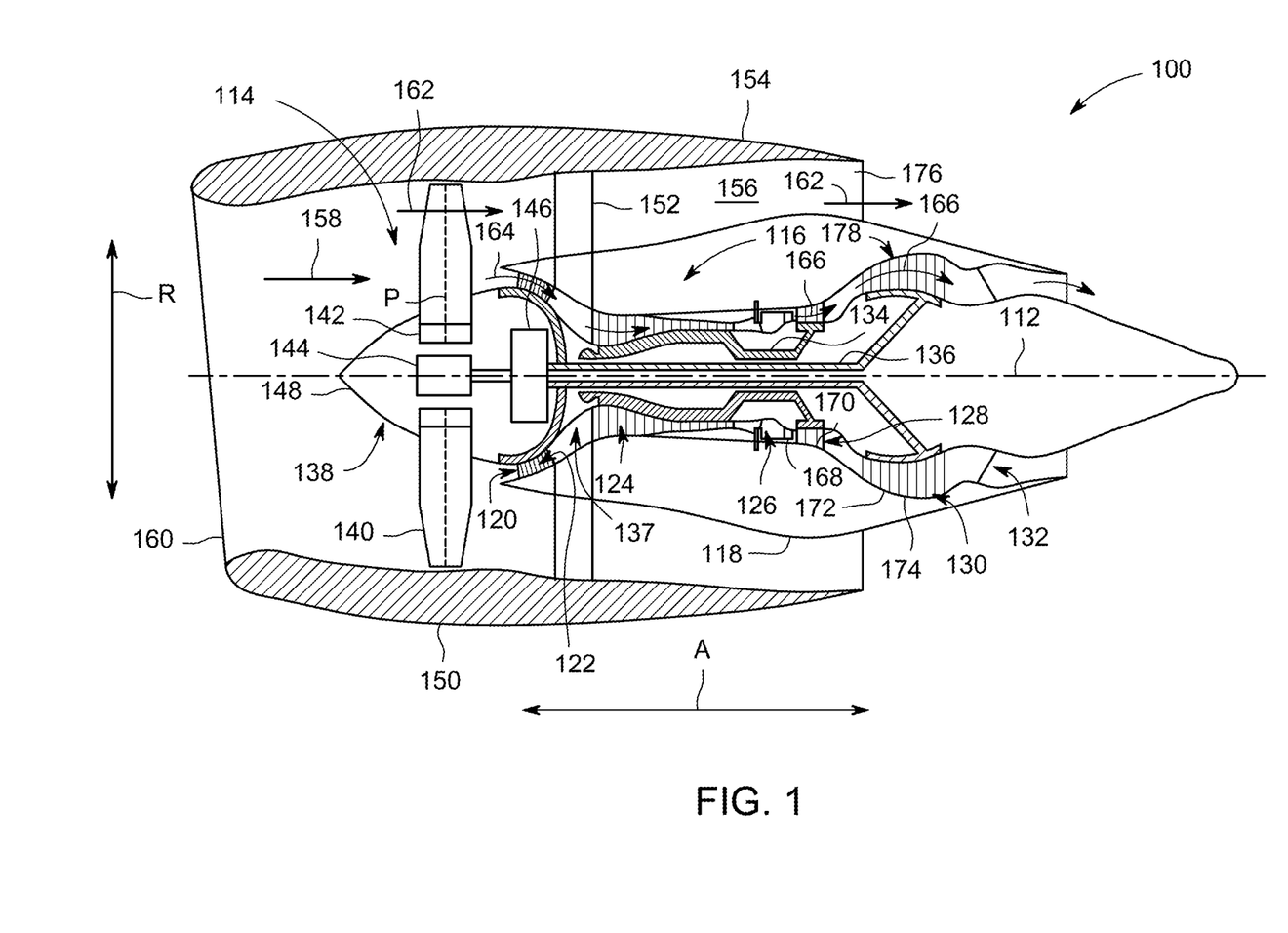
FIG. 1 is a schematic view of an exemplary gas turbine engine.

FIG. 1 is a schematic cross-sectional view of a gas turbine engine 110 in accordance with an exemplary embodiment of the present disclosure. In the exemplary embodiment, gas turbine engine 110 is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R. In general, turbofan engine 110 includes a fan section 114 and a core turbine engine 116 disposed downstream from fan section 114.

Exemplary core turbine engine 116 depicted generally includes a substantially tubular outer casing 118 that defines an annular inlet 120. Outer casing 118 encases, in serial flow relationship, a compressor section 123 including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to LP compressor 122. The compressor section 123, combustion section 126, turbine section, and nozzle section 132 together define a core air flowpath 137.

For the embodiment depicted, fan section 114 includes a variable pitch fan 138 having a plurality of fan blades 140 coupled to a disk 142 in a spaced apart manner. As depicted, fan blades 140 extend outwardly from disk 142 generally along radial direction R. Each fan blade 140 is rotatable relative to disk 142 about a pitch axis P by virtue of fan blades 140 being operatively coupled to a suitable pitch change mechanism 144 configured to collectively vary the pitch of fan blades 140 in unison. Fan blades 140, disk 142, and pitch change mechanism 144 are together rotatable about longitudinal axis 112 by LP shaft 136 across a power gear box 146. Power gear box 146 includes a plurality of gears for adjusting the rotational speed of fan 138 relative to LP shaft 136 to a more efficient rotational fan speed. In an alternative embodiment, fan blade 140 is a fixed pitch fan blade rather than a variable pitch fan blade.

In the exemplary embodiment, disk 142 is covered by rotatable front hub 148 aerodynamically contoured to promote an airflow through plurality of fan blades 140. Additionally, exemplary fan section 114 includes an annular fan casing or outer nacelle 150 that circumferentially surrounds fan 138 and/or at least a portion of core turbine engine 116. Nacelle 150 is configured to be supported relative to core turbine engine 116 by a plurality of circumferentially-spaced outlet guide vanes 152. A downstream section 154 of nacelle 150 extends over an outer portion of core turbine engine 116 so as to define a bypass airflow passage 156 therebetween.

During operation of turbofan engine 110, a volume of air 158 enters turbofan engine 110 through an associated inlet 160 of nacelle 150 and/or fan section 114. As volume of air 158 passes across fan blades 140, a first portion of air 158 as indicated by arrows 162 is directed or routed into bypass airflow passage 156 and a second portion of air 158 as indicated by arrow 164 is directed or routed into core air flowpath 137, or more specifically into LP compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gases 166 via sequential stages of LP turbine stator vanes 172 that are coupled to outer casing 118 and LP turbine rotor blades 174 that are coupled to LP shaft or spool 136, thus causing LP shaft or spool 136 to rotate which causes power gear box 146 to rotate LP compressor 122 and/or rotation of fan 138.

Combustion gases 166 are subsequently routed through jet exhaust nozzle section 132 of core turbine engine 116 to provide propulsive thrust. Simultaneously, the pressure of first portion of air 162 is substantially increased as first portion of air 162 is routed through bypass airflow passage 156 before it is exhausted from a fan nozzle exhaust section 176 of turbofan engine 110, also providing propulsive thrust. HP turbine 128, LP turbine 130, and jet exhaust nozzle section 132 at least partially define a hot gas path 178 for routing combustion gases 166 through core turbine engine 116.

Exemplary turbofan engine 110 depicted in FIG. 1 is by way of example only, and that in other embodiments, turbofan engine 110 may have any other suitable configuration. In still other embodiments, aspects of the present disclosure may be incorporated into any other suitable gas turbine engine. For example, in other embodiments, aspects of the present disclosure may be incorporated into, e.g., a turboprop engine.

Figure 2:
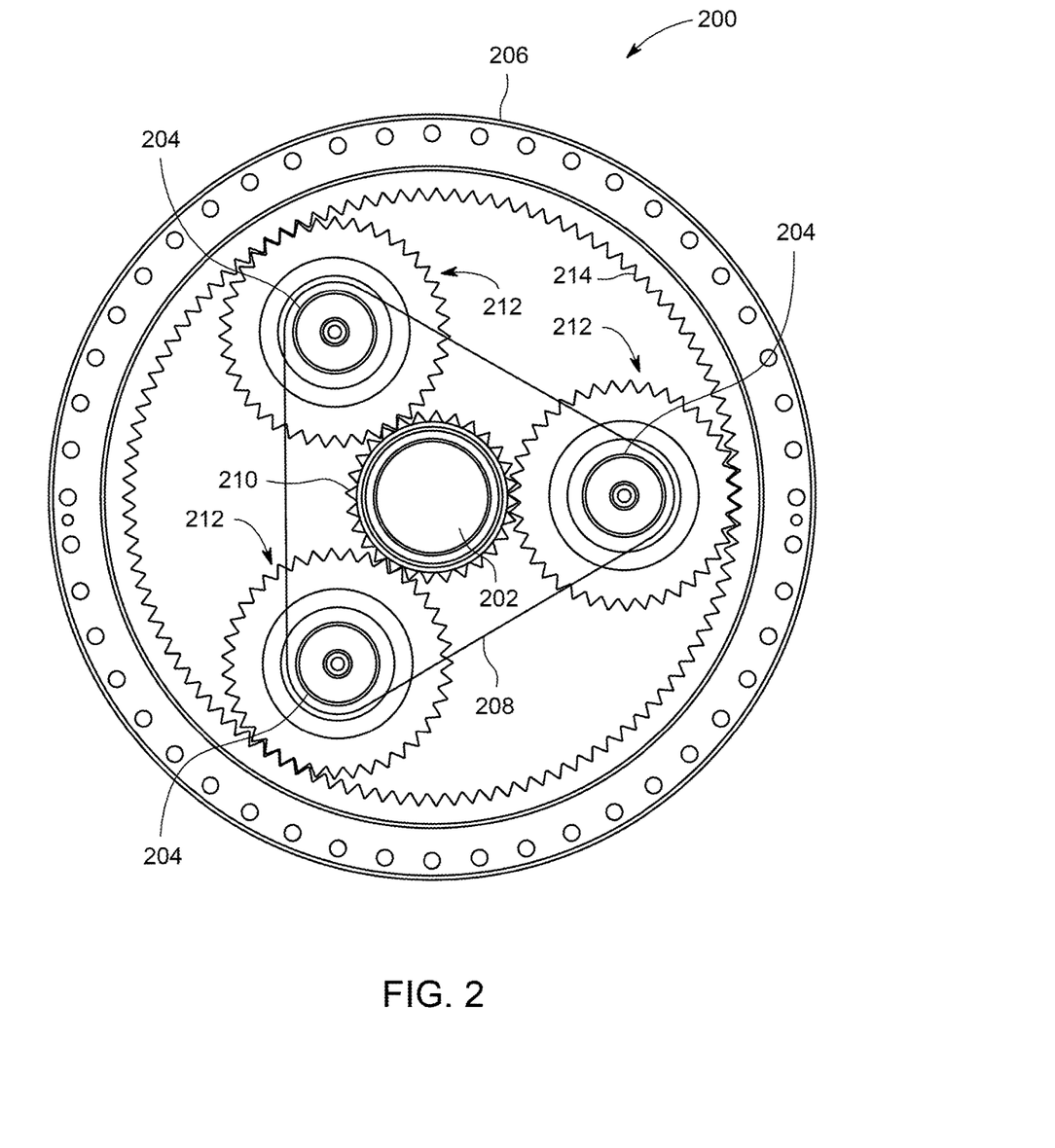
FIG. 2 is a schematic diagram of an exemplary epicyclic gear train that is used with the gas turbine engine shown in FIG. 1.

FIG. 2 is a schematic diagram of an epicyclic gear train 200. In the exemplary embodiment, epicyclic gear train 200 is a star gear train. In another exemplary embodiment, epicyclic gear train 200 is a planetary gear train. In one embodiment, epicyclic gear train 200 is housed within power gearbox 146 (shown in FIG. 1). In other embodiments, epicyclic gear train 200 is located adjacent to power gearbox 146 and is mechanically coupled to it.

Epicyclic gear train 200 includes a sun gear 202, a plurality of planetary gears 204, a ring gear 206, and a carrier 208. In alternative embodiments, epicyclic gear train 200 is not limited to three planetary gears 204. Rather, any number of planetary gears may be used that enables operation of epicyclic gear train 200 as described herein. In some embodiments, LP shaft or spool 136 (shown in FIG. 1) is fixedly coupled to sun gear 202. Sun gear 202 is configured to engage planetary gears 204 through a plurality of complementary sun gear teeth 210 and a plurality of complementary planet gear teeth 212 circumferentially spaced about a radially outer periphery of sun gear 202 and a radially outer periphery of planetary gears 204 respectively. Planetary gears 204 are maintained in a position relative to each other using carrier 208. Planetary gears 204 are fixedly coupled to power gearbox 146. Planetary gears 204 are configured to engage ring gear 206 through a plurality of complementary ring gear teeth 214 and complementary planet gear teeth 212 circumferentially spaced about a radially inner periphery of ring gear 206 and a radially outer periphery of planetary gears 204 respectively. Ring gear 206 is rotationally coupled to fan blades 140 (shown in FIG. 1), disk 142 (shown in FIG. 1), and pitch change mechanism 144 (shown in FIG. 1) extending axially from ring gear 206. LP turbine 130 rotates the LP compressor 122 at a constant speed and torque ratio which is determined by a function of ring gear teeth 214, planet gear teeth 212, and sun gear teeth 210 as well as how power gearbox 146 is restrained.

Epicyclic gear train 200 can be configured in three possible configuration: planetary, star, and solar. In the planetary configuration, ring gear 206 remains stationary while sun gear 202, planetary gears 204, and carrier 208 rotate. LP shaft or spool 136 drives sun gear 202 which is configured to rotate planetary gears 204 that are configured to rotate carrier 208. Carrier 208 drives fan blades 140, disk 142, and pitch change mechanism 144. Sun gear 202 and carrier 208 rotate in the same direction.

In the star configuration, carrier 208 remains stationary while sun gear 202 and ring gear 206 rotate. LP shaft or spool 136 drives sun gear 202 which is configured to rotate planetary gears 204. Planetary gears 204 are configured to rotate ring gear 206 and carrier 208 is fixedly coupled to power gearbox 146. Carrier 208 maintains planetary gears 204 positioning while allowing planetary gears 204 to rotate. Ring gear 206 is rotationally coupled to fan blades 140, disk 142, and pitch change mechanism 144. Sun gear 202 and ring gear 206 rotate in opposite directions.

In the solar configuration, sun gear 202 remains stationary while planetary gears 204, ring gear 206, and carrier 208 rotate. LP shaft or spool 136 can drive either the ring gear 206 or carrier 208. When LP shaft or spool 136 is coupled to carrier 208, planetary gears 204 are configured to rotate ring gear 206 which drives fan blades 140, disk 142, and pitch change mechanism 144. Ring gear 206 and carrier 208 rotate in the same direction.

In the solar configuration where LP shaft or spool 136 is coupled to ring gear 206, ring gear 206 is configured to rotate planetary gears 204 and carrier 208. Carrier 208 drives fan blades 140, disk 142, and pitch change mechanism 144. Ring gear 206 and carrier 208 rotate in the same direction.

Figure 3:
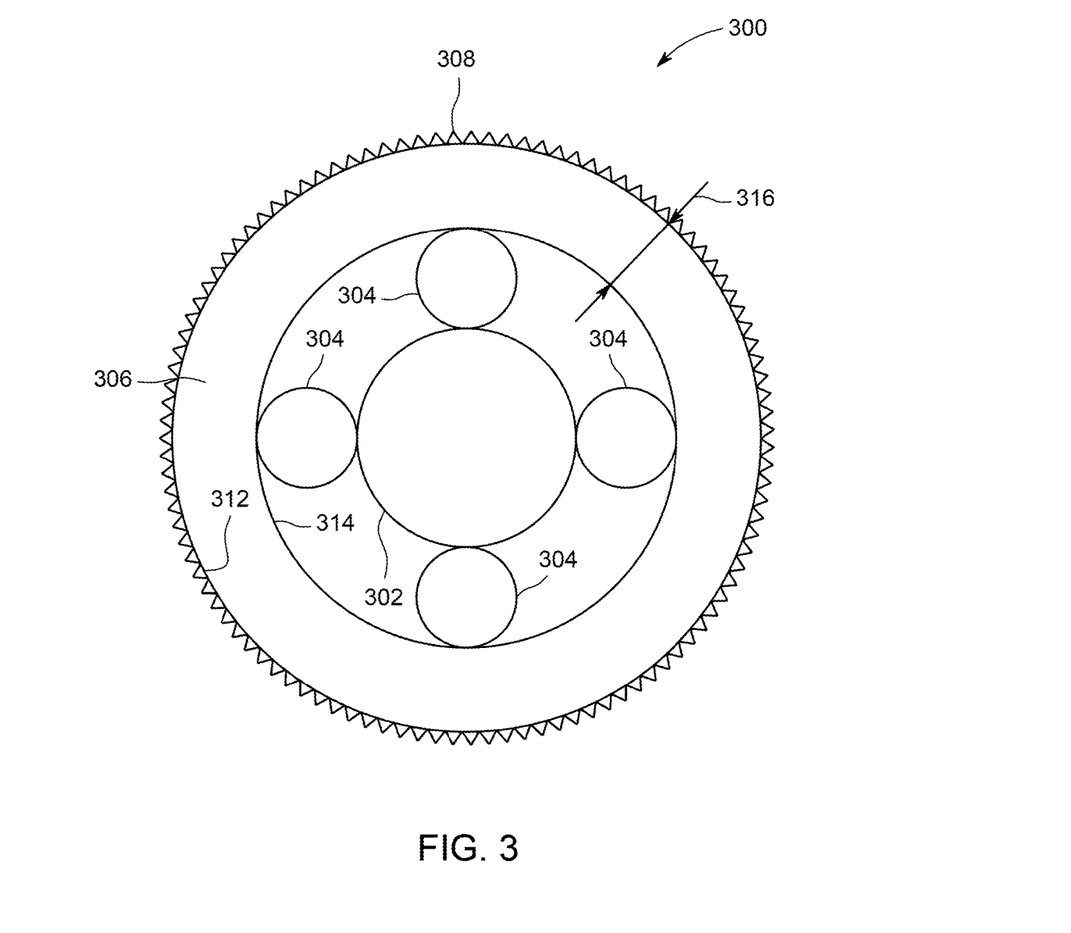
FIG. 3 is a schematic diagram of an exemplary planet gear that is used with the epicyclic gear train shown in FIG. 2.

FIG. 3 is a schematic diagram of a planet gear 300. Planet gear 300 includes an inner annular bearing ring 302, a plurality of rolling elements 304, a planet gear rim 306, and a plurality of teeth 308. Planet gear rim 306 includes an outer radial surface or gear root diameter 312, an inner radial surface 314, and a thickness 316. Carrier 208 (shown in FIG. 2) is coupled to inner annular bearing ring 302. Rolling elements 304 are disposed circumferentially around annular inner bearing ring 302. Planet gear rim 306 circumscribes rolling elements 304. Teeth 308 are disposed circumferentially about outer radial surface 312. Thickness 316 is the radial distance between outer radial surface or gear root diameter 312 and inner radial surface 314.

During operation, depending on the configuration of epicyclic gear train 200 (shown in FIG. 2), sun gear 202 (shown in FIG. 2), ring gear 206 (shown in FIG. 2), or LP power shaft 136 rotates planet gear 300. Planet gear rim 306 rotates around rolling elements 304 and inner annular bearing ring 302. Inner annular bearing ring 302 rotates carrier 208.

Figure 4:
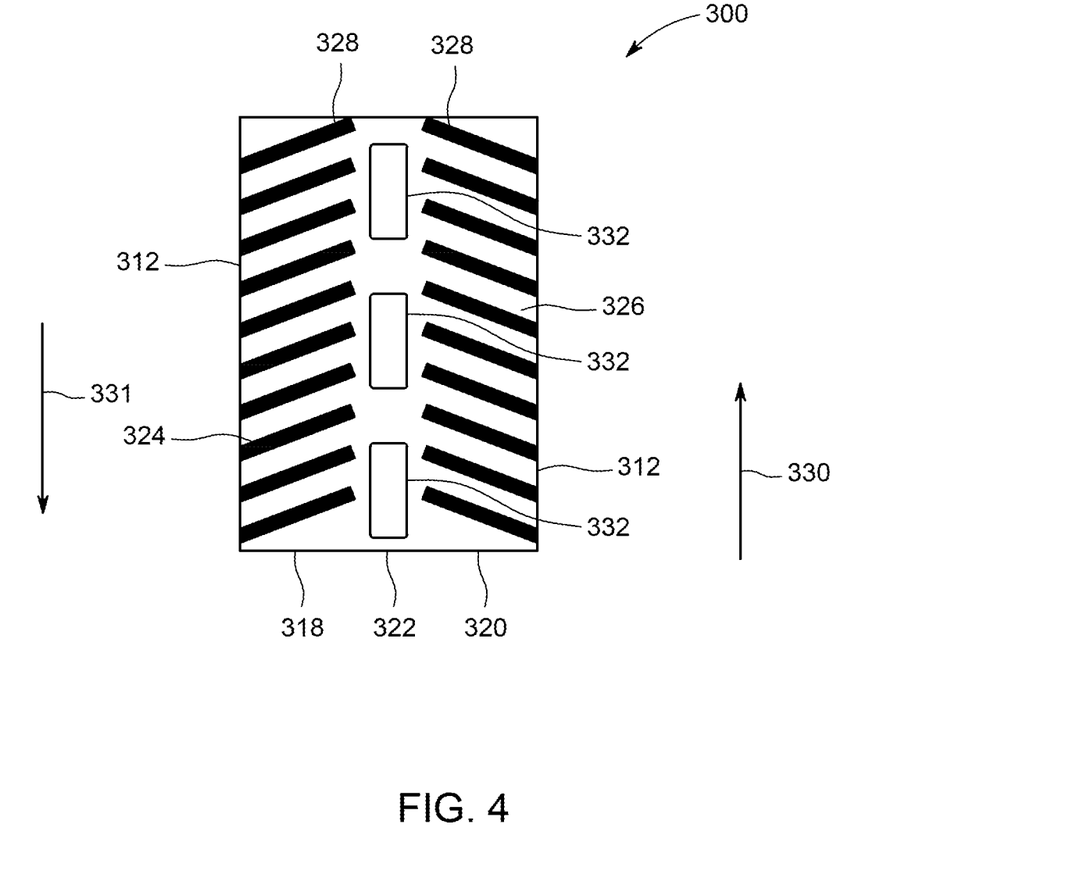
FIG. 4 is a side schematic diagram of the planet gear shown in FIG. 3.

FIG. 4 is a side schematic view of planet gear 300. In the exemplary embodiment, planet gear 300 is a double helix type gear with a first gear rim 318, a second gear rim 320, and an axial groove 322 extending between first gear rim 318 and second gear rim 320. A plurality of first gear teeth 324 is disposed circumferentially about outer radial surface 312 of first gear rim 318. A plurality of second gear teeth 326 is disposed circumferentially about outer radial surface 312 of second gear rim 320. Axial groove 322 enables hobbing of each of first and second gear teeth 324 and 326. Axial groove 322 does not add much load capacity to planet gear 300 but, axial groove 322 increases an axial extent of planet gear 300 and increases the weight of planet gear 300. Each gear tooth of plurality of first and second gear teeth 324 and 326 includes an apex 328 at the forward most portion of each of the first and second gear teeth 324 and 326 in a direction of rotation 330. In another embodiment, planet gear 300 rotates in a direction of rotation 331 opposite direction of rotation 330. First gear teeth 324 complement second gear teeth 326 such that the apexes 328 of first gear teeth 324 align with the apexes 328 of second gear teeth 326. Axial groove 322 does not include gear teeth. Additionally, first gear rim 318 includes a first gear rim rotational stiffness, second gear rim 320 includes a second gear rim rotational stiffness, and axial groove 322 includes an axial groove rotational stiffness.

During operation, operational loads on planet gear 300 may misalign first and second gear teeth 324 and 326 in the circumferential, radial or axial direction or some combination of all three. A particular type of misalignment of first and second gear teeth 324 and 326 occurs when the apexes 328 of first gear teeth 324 are not aligned with apexes 328 of second gear teeth 326. Misalignment of first and second gear teeth 324 and 326 reduces the efficiency and power output of epicyclic gear train 200 (shown in FIG. 2).

To reduce misalignment of first and second gear teeth 324 and 326, planet gear 300 includes a plurality of penetrations 332 defined and extending through axial groove 322. Penetrations 332 reduce the axial groove rotational stiffness such that the axial groove rotational stiffness is less than at least one of the first rim rotational stiffness and the second rim rotational stiffness. Reducing the axial groove rotational stiffness allows axial groove 322 to rotate slightly with respect to first gear rim 318 and second gear rim 320 when operational loads are placed on planet gear 300. Slight rotation of axial groove 322 realigns the apexes 328 of first and second gear teeth 324 and 326 and increases the efficiency, durability and power output of epicyclic gear train 200 (shown in FIG. 2). Thus, the axial groove rotational stiffness facilitates flexible alignment of first and second gear teeth 324 and 326. Another particular type of misalignment is coning, where the radial height of planet gear 300 varies from the start of the first gear rim 318, across axial groove 322 and into second gear rim 320. The reduced rotational stiffness of axial groove 322 allows first gear rim 318 and second gear rim 320 to bend with respect to each other to minimize this type of misalignment. Other types of misalignment may also occur which can be minimized by the reduced rotational stiffness of axial groove 322. Reducing misalignment reduces the stress on first and second gear teeth 324 and 326 and can result in much improved reliability and durability. Penetrations 332 also reduce the weight of planet gear 300, power gearbox 146 (shown in FIG. 1), and gas turbine engine 110 (shown in FIG. 1). Additionally, oil within power gearbox 146 (shown in FIG. 1) flows through penetrations 332 to improve lubrication of epicyclic gear train 200 (shown in FIG. 2). In the exemplary embodiment, penetrations 332 include rectangular penetrations. However, penetrations 332 includes penetrations of any shape disposed around a circumference of axial groove 322.

In an alternate embodiment, axial groove 322 does not include penetrations 332. Rather, axial groove 322 includes an axial groove material, first gear rim 318 includes a first gear rim material, and second gear rim 320 includes a second gear rim material. The axial groove material is different from at least one of the first gear rim material and the second gear rim material such that the axial groove rotational stiffness is less than at least one of the first rim rotational stiffness and the second rim rotational stiffness. Reducing the axial groove rotational stiffness allows axial groove 322 to rotate slightly with respect to first gear rim 318 and second gear rim 320 when operational loads are placed on planet gear 300. Slight rotation of axial groove 322 realigns the apexes 328 of first and second gear teeth 324 and 326 and increases the efficiency, durability and power output of epicyclic gear train 200 (shown in FIG. 2). Thus, the axial groove rotational stiffness facilitates flexible alignment of first and second gear teeth 324 and 326. Additionally, if axial groove material is lighter than first gear rim material and the second gear rim material, axial groove material reduces the weight of planet gear 300, power gearbox 146 (shown in FIG. 1), and gas turbine engine 110 (shown in FIG. 1).

First gear rim 318, second gear rim 320, and axial groove 322 include at least one material selected from a plurality of alloys including, without limitation, ANSI M50 (AMS6490, AMS6491, and ASTM A600), M50 Nil (AMS6278), Pyrowear 675 (AMS5930), Pyrowear 53 (AMS6308), Pyrowear 675 (AMS5930), ANSI9310 (AMS6265), 32CDV13 (AMS6481), ceramic (silicon nitride), Ferrium C61 (AMS6517), and Ferrium C64 (AMS6509). Additionally, in some embodiments, the metal materials can be nitrided to improve the life and resistance to particle damages. First gear rim 318, second gear rim 320, and axial groove 322 include any combination of alloys and any percent weight range of those alloys that facilitates operation of planet gear 300 as described herein, including, without limitation combinations of M50 Nil (AMS6278), Pyrowear 675 (AMS5930), and Ferrium C61 (AMS6517).

Figure 5:
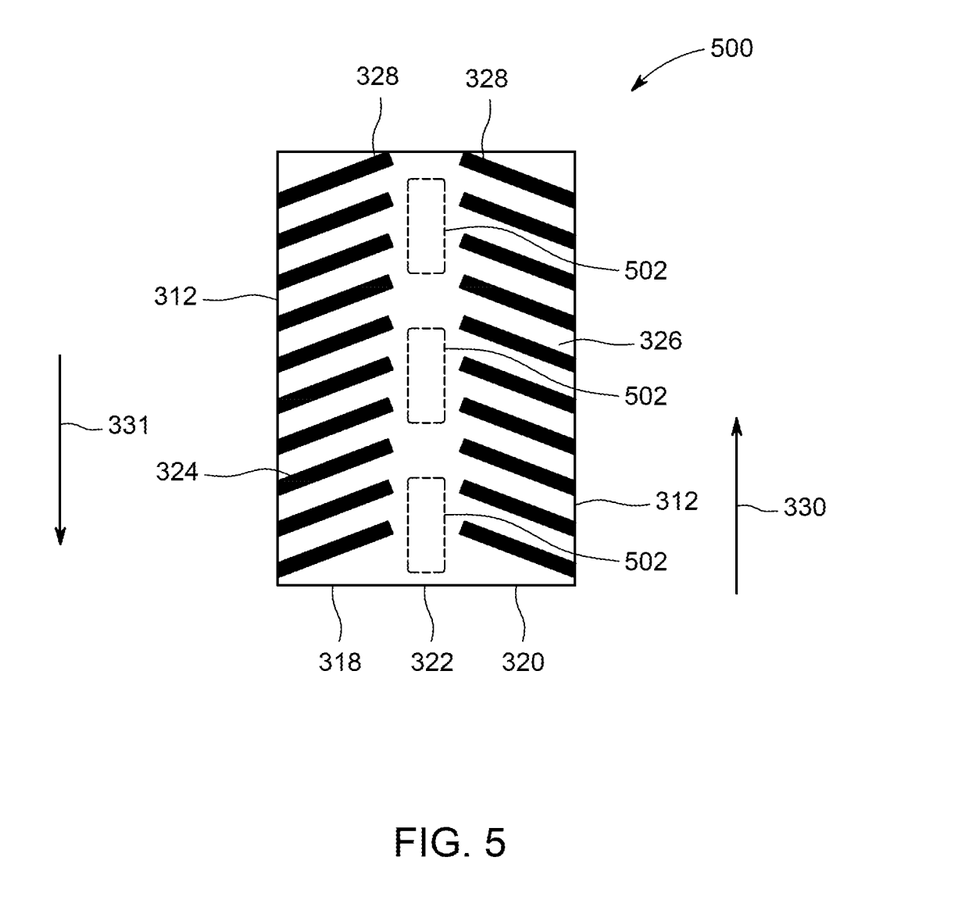
FIG. 5 is a side schematic diagram of an exemplary planet gear that is used with the epicyclic gear train shown in FIG. 2.

FIG. 5 is a side schematic view of a planet gear 500. Planet gear 500 includes a plurality of voids or pockets 502 defined within axial groove 322. Voids 502 reduce the axial groove rotational stiffness such that the axial groove rotational stiffness is less than at least one of the first rim rotational stiffness and the second rim rotational stiffness. Reducing the axial groove rotational stiffness allows axial groove 322 to rotate slightly with respect to first gear rim 318 and second gear rim 320 when operational loads are placed on planet gear 500. Slight rotation of axial groove 322 realigns the apexes 328 of first and second gear teeth 324 and 326 and increases the efficiency, durability and power output of epicyclic gear train 200 (shown in FIG. 2). Thus, the axial groove rotational stiffness facilitates flexible alignment of first and second gear teeth 324 and 326. Voids 502 also reduce the weight of planet gear 500, power gearbox 146 (shown in FIG. 1), and gas turbine engine 110 (shown in FIG. 1).

Figure 6:
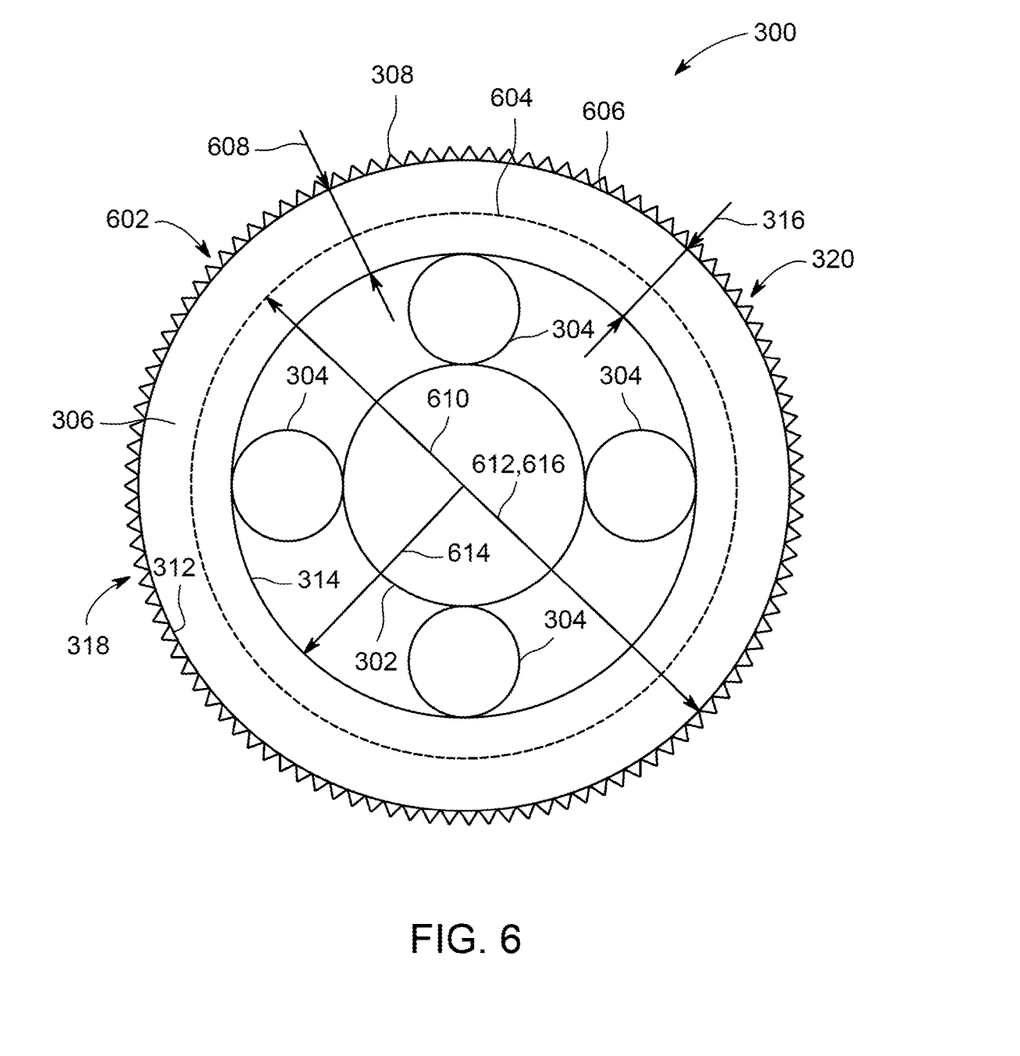
FIG. 6 is a schematic diagram of an exemplary planet gear that is used with the epicyclic gear train shown in FIG. 2.

FIG. 6 is a schematic view of a planet gear 600. Planet gear 600 includes an axial groove 602 with an axial groove inner radial surface 604 and an axial groove outer radial surface 606. Axial groove 302 further includes an axial groove thickness 608 extending between axial groove inner radial surface 604 and axial groove outer radial surface 606. Axial groove inner radial surface 604 includes an axial groove inner radius 610 and axial groove outer radial surface 606 includes an axial groove outer radius 612. First and second gear rims 318 and 320 include outer radial surface 312, inner radial surface 314 and thickness 316 extending between outer radial surface 312 and inner radial surface 314. Inner radial surface 314 includes an inner radius 614 and outer radial surface 312 includes an outer radius 616. In the exemplary embodiment, axial groove outer radius 612 is equal to outer radius 616 and axial groove inner radius 610 is longer than inner radius 614. Thus, axial groove thickness 608 is shorter than thickness 316. Reducing axial groove thickness 608 with respect to thickness 316 reduces the axial groove rotational stiffness and allows axial groove 602 to rotate slightly with respect to first gear rim 318 and second gear rim 320 when operational loads are placed on planet gear 600. Slight rotation of axial groove 602 realigns the apexes 328 of first and second gear teeth 324 and 326 and increases the efficiency, durability and power output of epicyclic gear train 200 (shown in FIG. 2). Thus, the axial groove rotational stiffness facilitates flexible alignment of first and second gear teeth 324 and 326. Reduced axial groove thickness 608 also reduces the weight of planet gear 500, power gearbox 146 (shown in FIG. 1), and gas turbine engine 110 (shown in FIG. 1).

Figure 7:
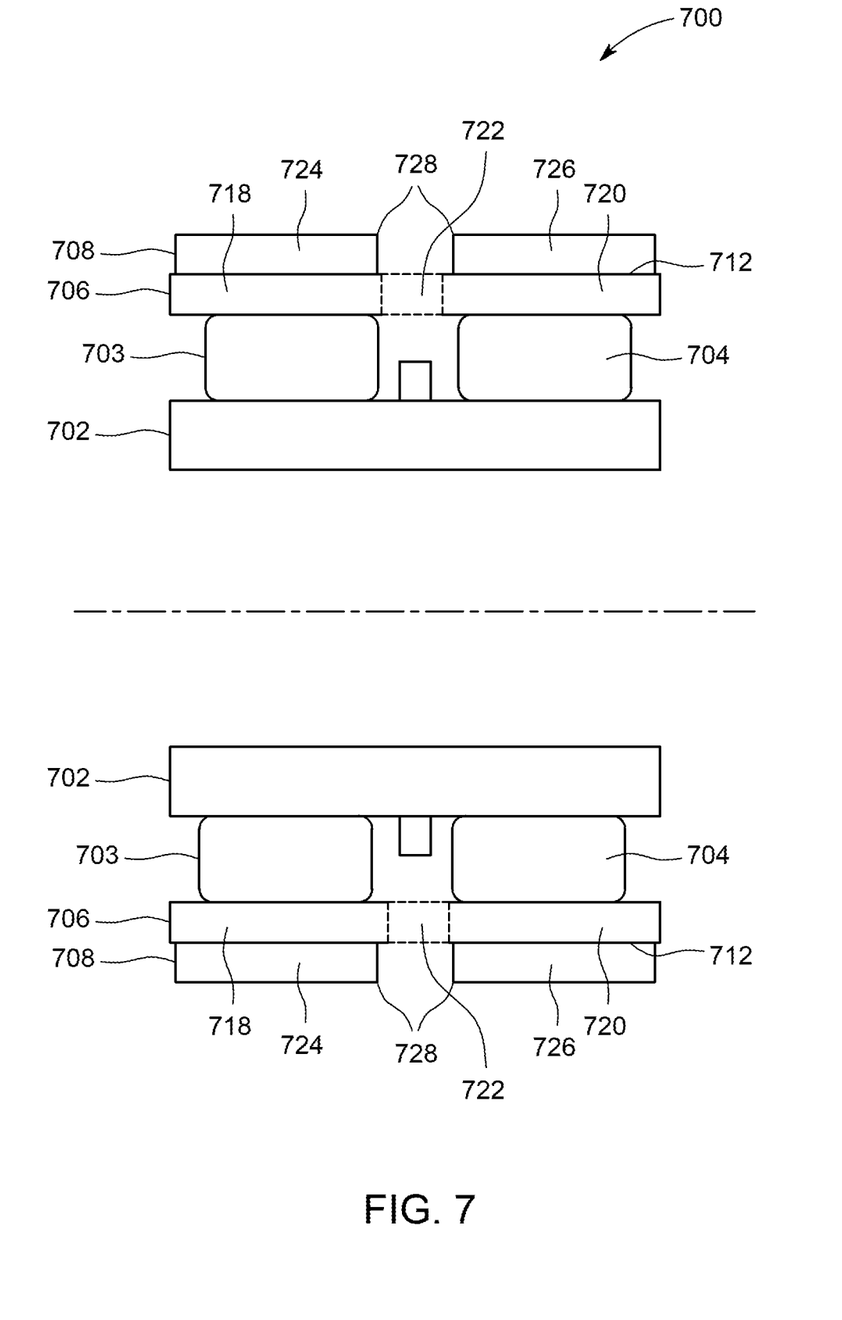
FIG. 7 is a cut away schematic diagram of an exemplary planet gear that is used with the epicyclic gear train shown in FIG. 2.

FIG. 7 is a cut away schematic diagram of a planet gear 700. Planet gear 700 includes an inner annular bearing ring 702, a plurality of first rolling elements 703, a plurality of second rolling elements 704, a planet gear rim 706, and a plurality of teeth 708. Planet gear rim 706 includes an outer radial surface or gear root diameter 712. In the exemplary embodiment, planet gear rim 706 is a double helix type gear rim with a first gear rim 718, a second gear rim 720, and an axial groove 722 extending between first gear rim 718 and second gear rim 720. A plurality of first gear teeth 724 is disposed circumferentially about outer radial surface 712 of first gear rim 718. A plurality of second gear teeth 726 is disposed circumferentially about outer radial surface 712 of second gear rim 720. Axial groove 722 enables hobbing of each of first and second gear teeth 724 and 726. Axial groove 722 does not add much load capacity to planet gear 700 but, axial groove 722 increases an axial extent of planet gear 700 and increases the weight of planet gear 700. Each gear tooth of plurality of first and second gear teeth 724 and 726 includes an apex 728 at the forward most portion of each of the first and second gear teeth 724 and 726 7. First gear teeth 724 complement second gear teeth 726 such that the apexes 728 of first gear teeth 724 align with the apexes 728 of second gear teeth 726. Axial groove 722 does not include gear teeth. Additionally, first gear rim 718 includes a first gear rim rotational stiffness, second gear rim 720 includes a second gear rim rotational stiffness, and axial groove 722 includes an axial groove rotational stiffness. Additionally, gear rim 706 circumscribes first rolling elements 703 and second rolling elements 704 such that first gear rim 718 circumscribes first rolling elements 703 and second gear rim 720 circumscribes second rolling elements 704. Neither first rolling elements 703 nor second rolling elements 704 are circumscribed by axial groove 722. That is, neither first rolling elements 703 nor second rolling elements 704 extend beneath axial groove 722.

During operation, operational loads on planet gear 700 may misalign first and second gear teeth 724 and 726 in the circumferential, radial or axial direction or some combination of all three. Axial groove 722 includes an axial groove material, first gear rim 718 includes a first gear rim material, and second gear rim 720 includes a second gear rim material. The axial groove material is different from at least one of the first gear rim material and the second gear rim material such that the axial groove rotational stiffness is less than at least one of the first rim rotational stiffness and the second rim rotational stiffness. Reducing the axial groove rotational stiffness allows axial groove 722 to rotate slightly with respect to first gear rim 718 and second gear rim 720 when operational loads are placed on planet gear 700. Thus, the axial groove rotational stiffness facilitates flexible alignment of first and second gear teeth 724 and 726. Additionally, having different sets of rolling elements (first rolling elements 703 and second rolling elements 704) rotate first gear rim 718 and second gear rim 720 allows axial groove 722 to rotate slightly with respect to first gear rim 718 and second gear rim 720 when operational loads are placed on planet gear 700. Additionally, restricting first rolling elements 703 and second rolling elements 704 to rotating first gear rim 718 and second gear rim 720 and not axial groove 722, allows for greater rotation of first gear rim 718 and second gear rim 720 relative to each other. Slight rotation of axial groove 722 realigns the apexes 728 of first and second gear teeth 724 and 726 and increases the efficiency, durability and power output of epicyclic gear train 200 (shown in FIG. 2). Additionally, if axial groove material is lighter than first gear rim material and the second gear rim material, axial groove material reduces the weight of planet gear 700, power gearbox 146 (shown in FIG. 1), and gas turbine engine 110 (shown in FIG. 1).

The above-described double helix gear provides an efficient method for aligning complementary gear teeth of a double-helical gear. Specifically, the axial groove has a reduced rotational stiffness which allows the axial groove to slightly rotate or bend and align complementary gear teeth of a double-helical gear. An alignment of complementary gear tooth of a double-helical gear improves the reliability of the double helix gear and improves the efficiency and power output of an epicyclic gear train. Finally, the double helix gear described herein reduces the weight of the aircraft by reducing the amount of material in the planet gear.

An exemplary technical effect of the methods, systems, and apparatus described herein includes at least one of: (a) decreasing the rotational stiffness of an axial groove; (b) aligning complementary gear teeth of a double helix gear; (c) increasing the reliability of the planet gear; (d) decreasing the weight of the aircraft engine; (e) increasing the efficiency of an epicyclic gear train; and (f) increasing the power output of an epicyclic gear train.

Exemplary embodiments of the double helix gear are described above in detail. The double helix gear, and methods of operating such units and devices are not limited to the specific embodiments described herein, but rather, components of systems and/or steps of the methods may be utilized independently and separately from other components and/or steps described herein. For example, the methods may also be used in combination with other systems which require a gear, and are not limited to practice with only the systems and methods as described herein. Rather, the exemplary embodiment may be implemented and utilized in connection with many other machinery applications that require double helix gears.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to describe the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gear comprising:
   a first gear rim having a first gear rim rotational stiffness, said first gear rim comprising a plurality of first gear teeth;
   a second gear rim having a second gear rim rotational stiffness, said second gear rim comprising a plurality of second gear teeth complementing said plurality of first gear teeth, thereby defining a plurality of complementary first gear teeth and a plurality of complementary second gear teeth; and an axial groove extending between said first gear rim and said second gear rim, said axial groove having an axial groove rotational stiffness less than at least one of the first gear rim rotational stiffness and the second gear rim rotational stiffness.

2. The gear of claim 1, wherein said axial groove comprises a plurality of penetrations configured to reduce the axial groove rotational stiffness.

3. The gear of claim 1, wherein said first gear rim having a first gear rim inner radius and a first gear rim outer radius, the first gear rim inner radius and the first gear rim outer radius defining a first gear rim thickness therebetween, said axial groove having an axial groove inner radius and an axial groove outer radius, the axial groove inner radius and the axial groove outer radius defining an axial groove thickness therebetween, wherein the first gear rim thickness is greater than the axial groove thickness.

4. The gear of claim 3, wherein said second gear rim having a second gear rim inner radius and a second gear rim outer radius, the second gear rim inner radius and the second gear rim outer radius defining a second gear rim thickness therebetween, wherein the second gear rim thickness is greater than the axial groove thickness.

5. The gear of claim 4, wherein the first gear rim thickness is about equal to the second gear rim thickness.

6. The gear of claim 5, wherein said axial groove further comprises a plurality of penetrations configured to reduce the axial groove rotational stiffness.

7. The gear of claim 5, wherein said axial groove further comprises a plurality of voids configured to reduce the axial groove rotational stiffness.

8. The gear of claim 1, wherein said first gear rim comprises a first material having a first material rotational stiffness, said axial groove comprises an axial groove material having an axial groove material rotational stiffness, wherein the axial groove material rotational stiffness is less than the first material rotational stiffness.

9. The gear of claim 8, wherein said second gear rim comprises a second material having a second material rotational stiffness, wherein the axial groove material rotational stiffness is less than the second material rotational stiffness.

10. The gear of claim 1, wherein said axial groove comprises a plurality of voids configured to reduce the axial groove rotational stiffness.

11. The gear of claim 1 further comprising a bearing, wherein said gear is disposed circumferentially about said bearing.

12. The gear of claim 11, wherein said bearing comprises a rolling element bearing.

13. The gear of claim 12, wherein said rolling element bearing comprises an annular inner bearing ring and a plurality of rolling elements, said plurality of rolling elements disposed circumferentially about said annular inner bearing ring, said gear disposed circumferentially about said plurality of rolling elements.

14. The gear of claim 13, wherein said plurality of rolling elements comprises a plurality of first rolling elements and a plurality of second rolling elements, wherein said first gear rim circumscribes said plurality of first rolling elements and said second gear rim circumscribes said plurality of second rolling elements.

15. A gear assembly comprising:
a sun gear;
a ring gear; and
a plurality of planet gears coupled to said ring gear and said sun gear, each planet gear of said plurality of planet gears comprising:
an annular gear rim comprising:
a first gear rim having a first gear rim rotational stiffness, said first gear rim comprising a plurality of first gear teeth;
a second gear rim having a second gear rim rotational stiffness, said second gear rim comprising a plurality of second gear teeth complementing said plurality of first gear teeth, thereby defining a plurality of complementary first gear teeth and a plurality of complementary second gear teeth; and
an axial groove extending between said first gear rim and said second gear rim, said axial groove having an axial groove rotational stiffness less than at least one of the first gear rim rotational stiffness and the second gear rim rotational stiffness.

16. The gear assembly of claim 15 further comprising a carrier, wherein said sun gear, said plurality of planet gears, said ring gear, and said carrier are configured in a planetary configuration.

17. The gear assembly of claim 15 further comprising a carrier, wherein said sun gear, said plurality of planet gears, said ring gear, and said carrier are configured in a star configuration.

18. The gear assembly of claim 15 further comprising a carrier, wherein said sun gear, said plurality of planet gears, said ring gear, and said carrier are configured in a solar configuration.

19. The gear assembly of claim 18 further comprising a power shaft coupled to said carrier.

20. A turbomachine comprising:
a power shaft; and
a gear assembly, said power shaft rotationally coupled to said gear assembly, said gear assembly comprising:
a sun gear;
a ring gear; and
a plurality of planet gears coupled to said ring gear and said sun gear, each planet gear of said plurality of planet gears comprising:
an annular gear ring comprising:
a first gear rim having a first gear rim rotational stiffness, said first gear rim comprising a plurality of first gear teeth;
a second gear rim having a second gear rim rotational stiffness, said second gear rim comprising a plurality of second gear teeth complementing said plurality of first gear teeth, thereby defining a plurality of complementary first gear teeth and a plurality of complementary second gear teeth; and
an axial groove extending between said first gear rim and said second gear rim, said axial groove having an axial groove rotational stiffness less than at least one of the first gear rim rotational stiffness and the second gear rim rotational stiffness.

* * * * *